Dec. 27, 1960   D. FRENCH   2,966,219
HARROW DRAG CART
Filed June 24, 1957   2 Sheets-Sheet 1
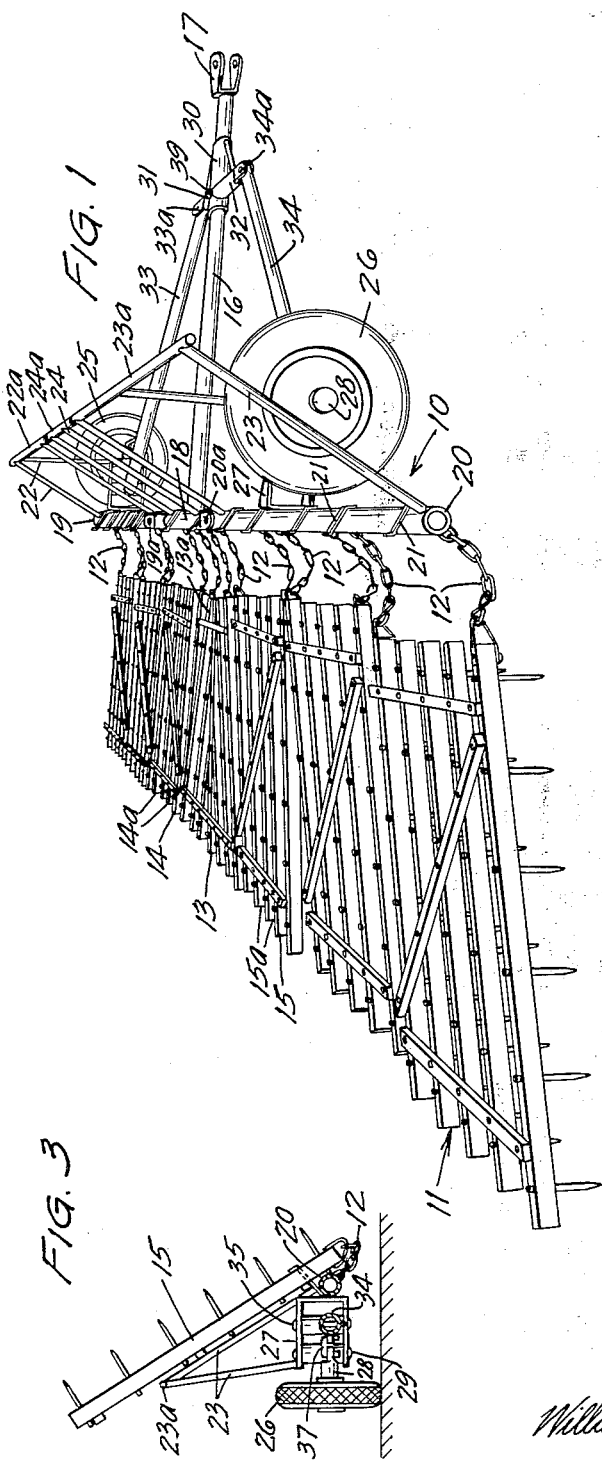
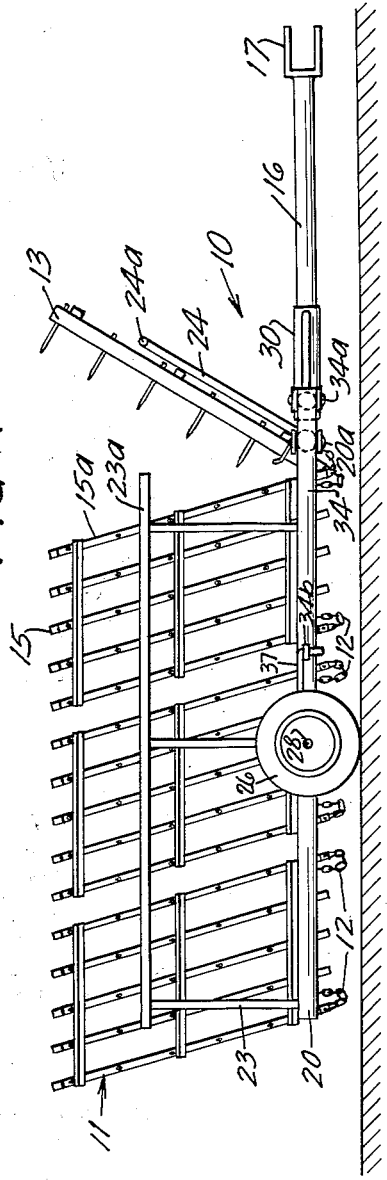
INVENTOR
DAMAS FRENCH
BY Williamson, Schroeder, Adams & Meyers
ATTORNEYS

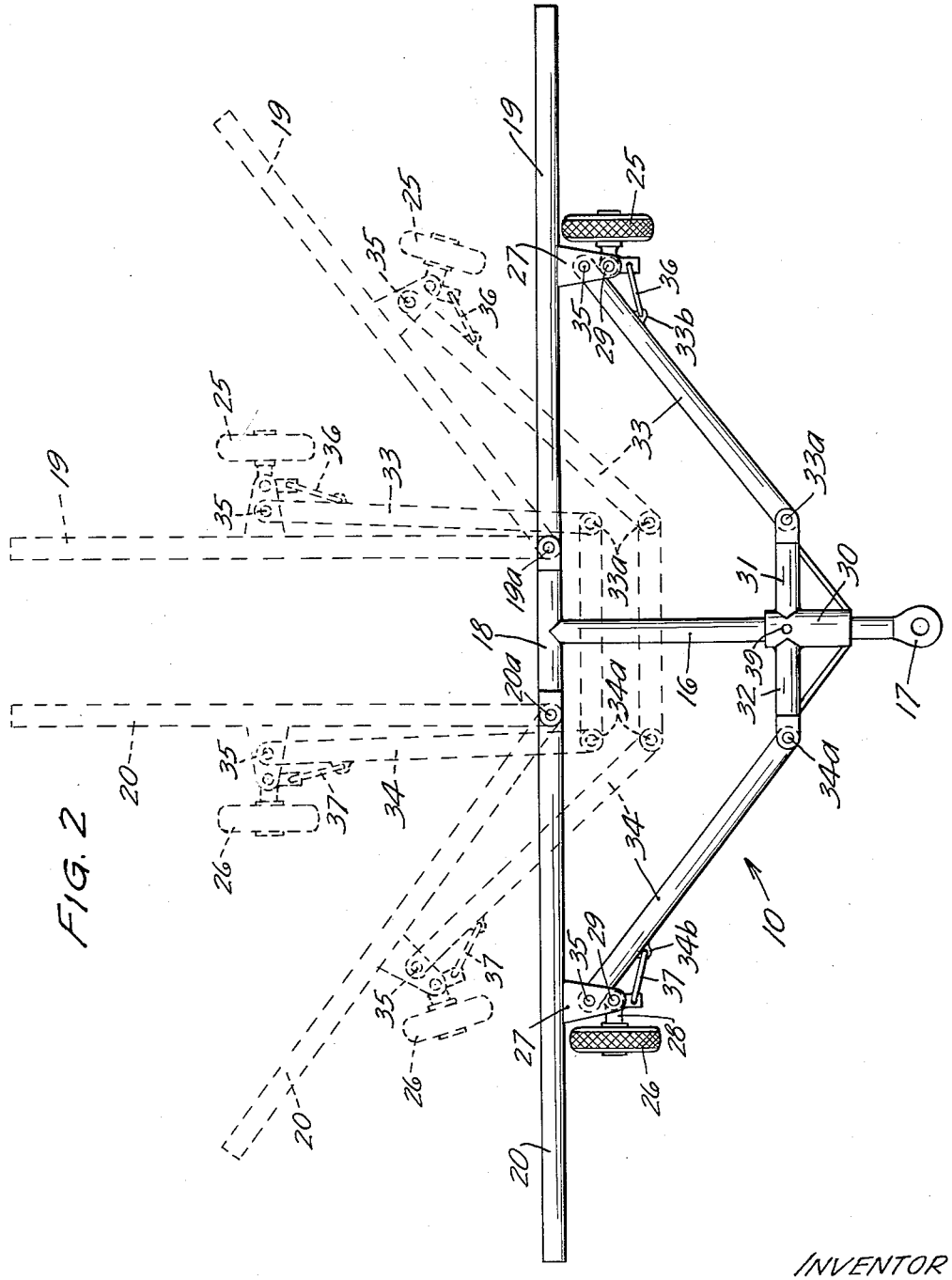

United States Patent Office 2,966,219
Patented Dec. 27, 1960

2,966,219

HARROW DRAG CART

Damas French, Grafton, N. Dak.

Filed June 24, 1957, Ser. No. 667,386

8 Claims. (Cl. 172—289)

This invention relates to foldable mobile trailers and more specifically relates to a foldable drag cart for carrying harrow sections and the like.

An object of my invention is to provide a mobile trailer of simple and inexpensive construction which is readily and easily expandable for use and foldable into transport condition.

Another object of my invention is to provide a foldable mobile trailer which has elongated transversely extending frame sections which are foldable inwardly into transport position in response to movement of the tractor and trailer along the ground.

A further object of my invention is to provide a mobile harrow drag cart which is adapted to drag a plurality of harrow sections and also adapted to carry the sections in confined position for transport on a highway or the like.

These and other objects and advantages of my invention will more fully appear from the following description made in connection with the accompanying drawings wherein like reference characters refer to the same or similar parts throughoutt he several views and in which:

Fig. 1 is a perspective view of the drag cart in open condition;

Fig. 2 is a top plan view of the drag cart with portions removed for clarity and showing, in full lines, the drag cart in open condition, and showing in dotted lines, the drag cart in folded position, and also showing an intermediate position of the drag cart as it is folded between the other positions;

Fig. 3 is a detail section view, taken on a vertical plane and showing one of the wheel mountings and control linkage therefor; and Fig. 4 is a side elevation view of the drag cart in inwardly folded condition and showing the manner in which the harrow sections are carried thereon.

One form of the present invention invention is shown in the accompanying drawings and is described herein. The drag cart, indicated in general by the numeral 10, and as best seen in Fig. 1 the harrow sections, indicated in general by numeral 11, are connected to the drag cart by chains 12 and in side-by-side relation.

The harrow sections 11 are uniquely constructed to produce the functional advantage hereinafter more fully set forth. The centermost harrow section which is indicated in general by the numeral 13 has a generally triangular exterior shape with the forward end 13a comprising the vertex of the triangle. The harrow sections 14 and 15 disposed adjacent the centermost section 13 and on opposite sides thereof, are shaped as parallelograms with the longitudinally extending frame members 14a and 15a extending diagonally with respect to the direction of travel of the harrow sections with the drag cart 10 and converging in a forward direction.

This unique shape of the harrow sections facilitates hanging of the sections on the drag cart 10 in such a manner as to permit ready and easy folding of the drag cart as will be more fully described hereinafter.

The drag cart includes an elongated tongue 16 having a clevis 17 on the forward end thereof for attachment to the drawbar of a tractor or the like. A rigid member 18 is affixed to the rear end of tongue 16 and extends transversely outwardly therefrom in opposite directions.

A pair of frame members 19 and 20 are swingably connected to the ends of the rigid member 18 and normally extend transversely outwardly from the tongue 16 and in alignment with each other for dragging the harrow sections over the ground. The frame members 19 and 20 are adapted to swing rearwardly about the pivots 19a and 20a in substantially longitudinal relation to the tongue 16.

Means are provided on the frame members 19 and 20 and on the rigid cross member 18 for supporting the harrow sections in substantially upright position, and in the form shown, such means include a plurality of hooks 21 affixed as by welding on the frame members 19 and 20 and cross member 18 for projecting rearwardly therefrom for engaging and supporting the forward cross members of the harrow sections. Bracing structures 22 and 23 and 24 are also affixed on the frame members 19 and 20 and rigid cross members 18 respectively and include railings 22a, 23a and 24a and upright supports connecting the railings to the frame members. It will be noted that the railings are disposed above and forwardly of the frame members 19 and 20 and that the upright supports for the railings are inclined so as to support the harrow sections in a somewhat inclined position on the frame members.

Means are provided for supporting the frame members 19 and 20 off the ground and for urging the same inwardly into substantially parallel relation to the tongue as the drag cart is folded. In the form shown such means include a pair of ground-engaging support wheels 25 and 26 which are mounted on the frame members 19 and 20 in substantially identical fashion. Each of the frame members 19 and 20 has a rigid, forwardly extending bifurcated frame element 27 rigidly affixed thereto as by welding. Each of the frame elements 27 has a wheel mounting 28 swingably mounted thereon by pivot 29 which permits turning of the wheel mounting on a vertical axis relative to the corresponding frame member and the tongue 16.

A camming linkage mechanism is provided for each of the wheels 25 and 26 for turning the wheels relative to the tongue 16 and relative to the corresponding frame members and in response to rearward swinging of the frame members so as to turn the wheels 25 and 26 into planes extending oblique to the tongue 16 and then into planes generally parallel to the tongue as the frame elements 19 and 20 are swung rearwardly into their second positions. In the form shown the camming linkage mechanisms include a sleeve 30 telescopically mounted on the tongue 16 and slidable thereon and having a pair of outwardly extending cross members 31 and 32 affixed thereto as by welding, the outer ends of which are disposed transversely outwardly a distance slightly further than the outer ends of the cross member 18 which is rigid with the tongue 16. The outer ends of the cross members 31 and 32 are bifurcated and have outwardly extending control or guiding links 33 and 34 respectively connected thereto by pivots 33a and 34a respectively. Links 33 and 34 are constructed of rigid tubing in the form shown. The outer ends of links 33 and 34 are swingably connected on pivots 35 to the bifurcated frame element 27 so as to be swingably connected with the corresponding frame members 19 and 20. Timing links 36 and 37 are swingably connected to the control links 33 and 34 respectively at positions inwardly from the outer ends thereof, and more specifically in the form shown, the links 33 and 34 have horizontal apertured ears 33b and 34b affixed thereon and provide pivotal connections to the timing links 36 and 37. The outer ends of the timing links 36 and 37 are swingably connected to the wheel mountings 28 so as to produce coordinated swinging of the wheel mounts with the camming motion of the linkage mechanism and the swinging of the frame members 19 and 20.

Means are provided for releaseably holding the frame members 19, 20 in their outwardly extended positions and in the form shown, such means include a pair of aligned apertures 38 through the sleeve 30 and the tongue 16 and a pin 39 extending through the apertures.

In operation, the drag cart 10 will be attached to a tractor, and while in use on a field, the frame members 19 and 20 extend transversely outwardly of the tongue 16 and are held in this position by the pin 39, and the harrow sections are dragged along the ground.

When it is desired to use the implement on another field requiring transport along a highway or through other confined areas, the harrow sections are lifted onto the hooks 21 and are leaned against the structure 22. The harrow sections 14 and 15 seem to lean outwardly, but are adequately supported and the unique arrangement of the harrow sections allows the harrow sections to lean against the railings of the structure 22 and to fold rearwardly and inwardly with swinging of the frame members 19 and 20 and without interefering with each other. As the harrow sections, immediately adjacent the centermost section 13 swing rearwardly, the upper portions thereof swing well away from the edges of the centermost section 13 and will ultimately be disposed well rearwardly from the centermost section 13.

Folding of the drag cart is accomplished by removing the pin 39 from the tongue and sleeve so as to permit sliding of the sleeve along the tongue. The drag cart is then pulled forwardly by the tractor and the wheels 25 will tend to lag behind the tongue 16 causing an immediate initial swinging of the frame members 19 and 20 and an immediate rearward sliding of the sleeve 30 along the tongue 16. This produces a swinging of the control links 33 and 34 and of the timing links 36 and 37 which causes a turning of the wheel mountings 28 and wheels 25 and 26 into oblique relation with respect to the tongue, as best seen in dotted position B in Fig. 2. The wheels are then oriented so as to converge with each other in forward movement along the ground. The converging motion of the wheels 25 and 26 tends to urge the frame members 19 and 20 inwardly toward their second position in dotted lines and indicated by the letter C in Fig. 2. As the frame members 19 and 20 move toward their second position, the sliding of the sleeve 30 and the swinging of the linkage mechanism continues, and as the frame members 19 and 20 approach the second position wherein they are substantially parallel to each other and parallel to the tongue 16, the linkage mechanism causes the wheel mountings and wheels to turn again so as to orient the wheels in substantially parallel relation with the tongue and the wheels are thereby oriented for travel along the highway.

It will be seen that the wheels are first oriented parallel to the tongue, are then turned inwardly into a "toe-in" position, and ultimately oriented parallel with each other and with the tongue again. Due to this arrangement the drag cart is folded by merely being pulled along the ground by the tractor.

When the drag cart has been transported to its destination, it will be opened again by merely driving the tractor in a reverse direction so as to move the drag cart 10 along the ground in a rearward or reverse direction.

The rearward thrust on the tongue tends to urge the tongue through the sleeve 30 which causes a turning of the wheels 25 and 26 into oblique relation to the tongue, and the wheels will thereby carry the ends of the frame members 19 and 20 in an outward direction. When the frame members 19 and 20 have been extended into alignment with each other the wheels will again assume their positions substantially parallel to each other. The pin 39 will then be inserted through the aligned apertures 38 and the harrow sections may be lowered onto the ground to be ready for use.

It will be seen that I have provided a new and improved drag cart or trailer attachment for tractors and the like which normally extend transversely outwardly from the tractor for a substantial distance and is readily and easily foldable into confined position by merely pulling the attachment along the ground with the tractor which causes the linkage mechanism on the attachment to "toe-in" the wheels which further urge the attachment into folded condition.

It should further be seen that I have provided a novel and improved harrow and drag cart assembly wherein the harrow sections are uniquely formed so as to permit the drag cart, when the harrow sections are carried thereby in an upright position, to be easily and readily folded into compact relation without causing the harrow sections to interfere with each other.

It will, of course, be understood that various changes may be made in the form, detail, arrangement and proportion of the parts without departing from the scope of my invention which consists of the matter described herein and set forth in the appended claims.

What is claimed is:

1. A trailer attachment for use with tractors and the like, comprising a fore-and-aft tongue attachable to tne tractor, an elongated frame member extending transversely of the tongue and being swingably connected thereto to move into a second position in generally longitudinal relation to the tongue, a pair of ground-engaging support wheels on opposite sides of the tongue, a wheel mounting swingably connected to the frame member on an upright axis and carrying one of the wheels in a plane generally parallel to the tongue to permit fore-and-aft travel of the wheel, mounting means connecting the other wheel with the tongue, and a wheel-positioning linkage mechanism interconnecting said tongue, said frame member and said wheel mounting and swinging said wheel mounting in response to swinging of the frame member to sequentially turn the corresponding wheel into a plane oblique to the tongue and then into a plane generally parallel to the tongue as the frame member is swung toward and then into said second position, whereby as the trailer is drawn along the ground, the turning of the wheel, in response to initial swinging of the frame member, produces further swinging of the frame member until the second position thereof is reached.

2. A trailer attachment for use with tractors and the like, comprising a fore-and-aft tongue attachable to the tractor, an elongated frame member extending transversely of the tongue and being swingably connected thereto to move into a second position in generally longitudinal relation to the tongue, a pair of ground-engaging support wheels on opposite sides of the tongue, a wheel mounting swingably connected to the frame member on an upright axis and carrying one of the wheels in a plane generally parallel to the tongue, to permit fore-and-aft travel of the wheel, mounting means connecting the other wheel with the tongue, and a wheel-positioning linkage mechanism having swinging connections with said tongue, said frame member and said wheel mounting and also having sliding connection with one of said same and producing swinging of the wheel mounting in response to swinging of the frame member to sequentially turn the corresponding wheel into a plane oblique to the tongue and then into a plane generally parallel to the tongue as the frame member is swung toward and then into said second position, whereby initial swinging of the frame member produces swinging and sliding of the linkage mechanism with the corresponding parts and causes said wheel mounting and wheel to turn oblique to the tongue to produce further swinging of the frame member toward the second position thereof as the wheel rolls on the ground.

3. A trailer attachment for use with tractors and the like, comprising a fore-and-aft tongue attachable to the tractor, an elongated frame member extending transversely to the tongue and being swingably connected thereto to move into a second position in generally longitudinal relation to the tongue, a pair of ground-engaging support wheels on opposite sides of the tongue, a wheel mounting swingably connected to the frame member on an upright axis and carrying one of the wheels in a plane generally parallel to the tongue to permit fore-and-aft travel of the wheel, mounting means connecting the other wheel with the tongue, and a wheel-positioning linkage mechanism having swinging connections with said frame member and said wheel mounting and also having a slidable and swingable connection with the tongue, and said linkage mechanism producing a swinging of said wheel mounting in response to swinging of the frame member to sequentially turn the corresponding wheel into a plane oblique to the tongue and then in a plane generally parallel to the tongue as the frame member is swung toward and then into said second position, whereby as the trailer is drawn along the ground, initial swinging of the frame member produces swinging and sliding of the linkage mechanism along the tongue which causes the wheel to turn and produce further swinging of the frame member until the second position thereof is reached whereupon the wheel is again generally parallel to the tongue to facilitate ready and easy transport of the trailer attachment.

4. The invention set forth in claim 3 and the linkage mechanism including a sleeve slidable on the tongue, and releasable means restraining movement of the sleeve on the tongue whereby to secure the frame member transversely of the tongue.

5. The invention set forth in claim 3 wherein said frame member is swingably connected with the rear end portion of the tongue and is swingable rearwardly into said second position to extend generally rearwardly from the tongue, and said linkage mechanism including a sleeve slidably mounted on the forward end portion of the tongue and also including cooperating steering links extending forwardly from the frame member and said wheel mounting to said sleeve.

6. A tractor attachment for dragging and transporting harrow sections and the like, comprising a fore-and-aft tongue attachable to the tractor, a pair of elongated frame members extending transversely outwardly from the tongue in opposite directions and being swingably connected thereto to move into second positions in generally longitudinal relation to the tongue, means supporting the harrow sections in substantially upright positions on the frame members, a pair of ground-engaging support wheels on opposite sides of the tongue and each disposed adjacent a corresponding frame member, a pair of wheel mountings each swingably connected to a respective frame member on an upright axis and carrying one of the wheels in a plane generally parallel to the tongue to permit fore-and-aft travel of the wheel, a pair of wheel-positioning linkage mechanisms each having swinging connections with the tongue and a corresponding frame member and wheel mounting, one of said swinging connections also permitting sliding between the interconnected parts, and each of said linkage mechanisms producing swinging of the wheel mounting in response to swinging of the corresponding frame member to sequentially turn the corresponding wheel into a plane oblique to the tongue and then into a plane generally parallel to the tongue as the frame member is swung toward and then into said second position, whereby the wheels turn oblique to the tongue, in response to travel of the trailer attachment along the ground and initial swinging of the frame members which produces swinging and sliding of the linkage mechanism, to cause further swinging of the frame members until the second positions thereof are reached.

7. A trailer attachment for use with a tractor and the like, comprising a fore-and-aft tongue attachable to the tractor, a pair of elongated frame members extending transversely from the tongue in opposite directions and being swingably connected thereto to move into second positions in generally longitudinal relation to the tongue, a pair of ground-engaging support wheels, a pair of wheel mountings each swingably connected to a respective frame member on an upright axis and carrying one of the wheels in a plane generally parallel to the tongue to permit fore-and-aft travel of the wheel, a pair of camming linkage mechanisms each having connection with the tongue and corresponding frame member and wheel mounting, and producing turning of the wheel mounting and wheel into a plane oblique to the tongue and then into a plane generally parallel to the tongue as the corresponding frame member is swung toward then into said second position, whereby in response to travel of the trailer attachment along the ground and initial swinging of the frame members, the linkage mechanisms produce by camming, turning of the wheels which cause further swinging of the frame members toward and into said second positions.

8. The invention set forth in claim 7 wherein said frame members are swingable rearwardly with respect to the tongue and wherein said camming linkage mechanisms each have swinging connections with the tongue and corresponding member and each also have sliding connection along one of the same.

References Cited in the file of this patent

UNITED STATES PATENTS

| | | |
|---|---|---|
| 2,648,545 | Cassidy | Aug. 11, 1953 |
| 2,743,115 | Rutledge | Apr. 24, 1956 |
| 2,787,477 | Melroe | Apr. 2, 1957 |

FOREIGN PATENTS

| | | |
|---|---|---|
| 683,357 | Great Britain | Nov. 26, 1952 |